2 Sheets—Sheet 1.
E. THOMSON.
DIRECT WELDING DYNAMO ELECTRIC MACHINE.
No. 389,779. Patented Sept. 18, 1888.
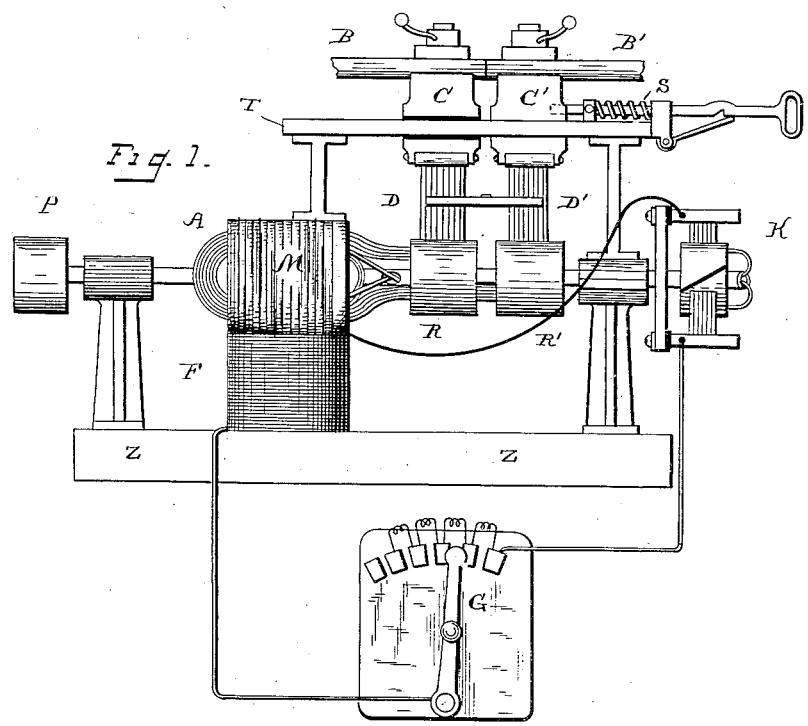
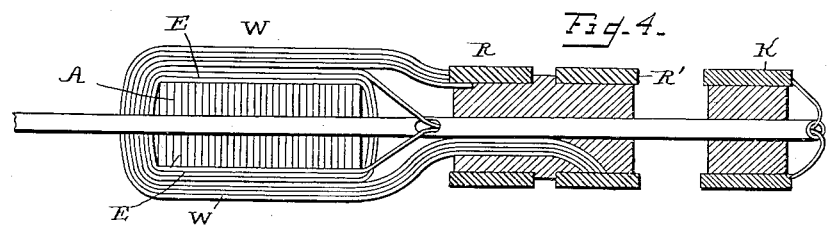
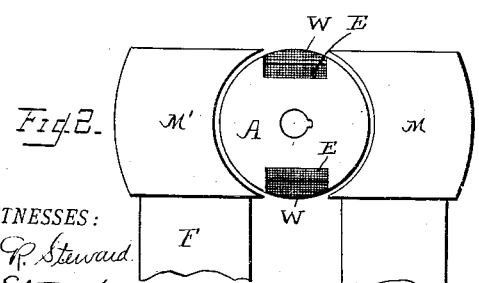
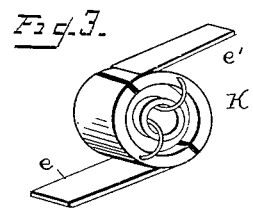
WITNESSES:
Ira R. Steward
O. K. Stuart
INVENTOR
Elihu Thomson
BY
Townsend MacArthur
ATTORNEYS 2 Sheets—Sheet 2.

E. THOMSON.
DIRECT WELDING DYNAMO ELECTRIC MACHINE.

No. 389,779. Patented Sept. 18, 1888.

WITNESSES:
Ira R. Steward
O. K. Stuart

INVENTOR
ELIHU THOMSON

BY
Townsend MacArthur
ATTORNEYS

UNITED STATES PATENT OFFICE.

ELIHU THOMSON, OF LYNN, MASSACHUSETTS.

DIRECT-WELDING DYNAMO-ELECTRIC MACHINE.

SPECIFICATION forming part of Letters Patent No. 389,779, dated September 18, 1888.

Application filed May 29, 1888. Serial No. 275,590. (No model.)

*To all whom it may concern:*

Be it known that I, ELIHU THOMSON, a citizen of the United States, and a resident of Lynn, in the county of Essex and State of Massachusetts, have invented a certain new and useful Direct Electric Welding-Machine, of which the following is a specification.

My invention relates to apparatus suitable for use in the operations of welding, forging, brazing, soldering, shaping, or other metal-working operations in which electric currents of large volume are employed as the means for heating the work to the proper temperature. An example of such operation is the process of electric welding set out in my prior patents, Nos. 347,140, 347,141, and 347,142, and to that particular metal-working operation I have shown my present improved apparatus as applied.

The object of my invention is to produce a simple, cheap, effective, and compact apparatus adapted for use in electric welding or similar operations and for supplying directly to the work and under suitable control the heavy electric currents required.

My invention consists in the novel features of construction and combinations of apparatus, which will be hereinafter described in connection with the accompanying drawings, and then specified in the claims.

Figure 5:
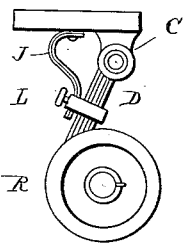
Figure 6:
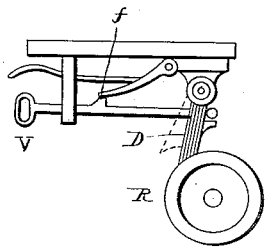
Figure 7:
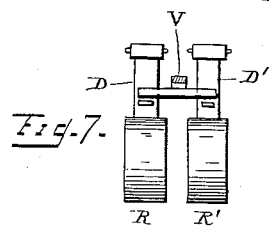
Figure 8:
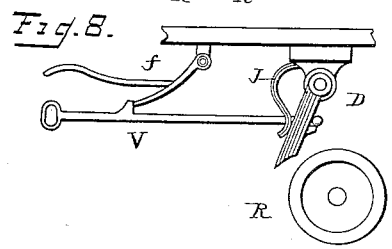

In the accompanying drawings, Figure 1 is a side elevation of a machine embodying my invention. Fig. 2 is a cross-section through the armature of the machine. Fig. 3 is an end elevation of the commutator from which the exciting-currents of the machine are taken. Fig. 4 is a longitudinal section of the armature, collecting-rings, and commutator. Fig. 5 is a side elevation of a collecting ring and brush. Fig. 6 is a side elevation of a device employed for removing the collecting-brush from contact with the ring. Fig. 7 is a detail view of the devices as applied to the two collecting-brushes. Fig. 8 shows the position of the parts illustrated in Fig. 6 when the collecting-brush is raised.

Z, Fig. 1, indicates the base of the apparatus, which sustains standards or bearings for the armature-shaft of the dynamo-machine. P indicates the driving-pulley of the armature-shaft; A, the armature; M, the field-magnet poles, and F the exciting-coil for the field magnet, which coil may obtain its exciting current either from the machine itself or from some other source. I preferably, however, supply it with current from a winding or coil upon the armature A, which winding is connected with the commutator K by wires running through a hollow armature-shaft. The armature winding for this purpose is indicated at E and is wound in a groove in the armature A, as indicated in Figs. 2 and 5. This winding consists of several turns, in order to develop current of somewhat greater potential than that employed for the welding or other metal-working operation. The commutator K is of any usual type for rectifying the currents generated in the coil.

Connected with the circuit of the exciting-coil E is an artificial variable resistance. (Indicated at G). By this resistance the excitation of the field may be varied for the purpose of determining the heating-current flowing to the work. The coil which supplies the heating-current is indicated at W, and consists of a number of insulated wires arranged in multiple and terminating as a single bundle in heavy copper rings R R', suitably mounted on the armature-shaft and insulated from one another. Upon these rings bear massive collecting-brushes D D', which are attached to or hung from the bodies of clamps or holders C C', that receive the work.

The clamps C C' are mounted upon a table or support, T, supported over the machine, as indicated, and one or both of the brushes D D' is hinged so that it may be withdrawn from contact with its collecting-ring when it is desired to cut off the working-current. The clamp or holder C is insulated from the table T, as indicated, while the holder C' is capable of movement toward the former by means of a spring, S, or by other device to adapt the apparatus for use in electric welding or similar operations. When the holder C' is moved, the brush D' moves with the same and over the surface of the collecting-ring R' in a direction parallel to the armature-shaft. By thus mounting the clamp or holder C', so as to move parallel with the armature-shaft, the connection of the brush D' with the collecting-ring R' will not be disturbed during the operation.

The heavy brushes are held down upon the ring normally by a heavy spring, J, Fig. 5, of copper or other material, formed of a number of laminæ, one end of said spring being attached to the under side of the clamp, while the other is fastened firmly to the body of the brush.

Owing to the volume of the currents developed, the machine must be run with the brushes bearing with considerable pressure against the rings, and it is therefore desirable to allow them to bear on said rings only when work is being done—as, for instance, when a piece is being heated for welding or other operation. In order to break the connection to the clamps, one or both the brushes may be raised from contact with the rings. A device suitable for this purpose consists of a rod having a handle, V, Fig. 6, and a cross-head extending across behind the brushes, as indicated. A suitable catch, f, is pivoted to the under side of the table, so as to engage with the rod and hold it in the position shown in Fig. 8 when the brush or brushes have been lifted from contact with the collecting-ring. The brushes may be restored to contact by simply lifting the latch f. The cross-head attached to the lifting-rod should be of insulating material or so insulated as not to electrically connect the two brushes.

The machine is driven by the pulley P.

In operating the apparatus the bar or bars or other metal object to be heated is inserted in the clamps C C' so as to form a connection between them. The collectors D D' being allowed to make contact with the rings R R' while the armature is revolving, a heavy heating electric current will be delivered to the work from the winding W, which current may be graduated in any desired manner by manipulating the artificial resistance G in the exciting-circuit. The brushes D D' are constructed so as to give large contact-surface.

The armature A is of the H shape indicated in Fig. 2, and both coils W E are wound in the same groove, preferably one over the other. The coil W preferably has all its strands in multiple, each strand going once around the armature only. In smaller machines each wire may have one or more extra turns. The exciting-coil E can be of a single wire.

By the construction shown I secure great compactness and reduce to a minimum the resistance between the working-armature coil W and the object to be heated.

The brushes D D' might each be replaced by two or more brushes performing similar functions to the single brushes.

What I claim as my invention is—

1. In an apparatus for electric welding, forging, or other metal-working operations requiring currents of large volume, a dynamo-generator having current-collecting brushes attached to the conducting-clamps or electrodes which hold the work.

2. In an apparatus for electric welding, forging, or other metal-working operations, as described, a dynamo-machine having a revolving armature and collectors for taking up the current generated, in combination with a movable clamp or abutment for the work mounted to be movable in line parallel with the armature-shaft and carrying one of the collectors with it.

3. In a dynamo-machine, an armature having two sets of coils or windings, one supported upon the other, one set consisting of a number of insulated conductors connected in multiple to continuous collecting-rings for supplying currents of large volume, and the other consisting of a number of turns adapted to deliver a current of higher potential, and connected through a suitable rectifying-commutator with a field-sustaining coil of the machine.

4. An apparatus for working metals by heavy electric currents, consisting, essentially, of a dynamo-machine having a revolving armature and work-sustaining clamps or abutments mounted on a table supported over the dynamo and connected directly with the collecting-brushes of said dynamo.

5. In an apparatus for electric working of metals, a dynamo-machine having a revolving armature provided with two windings, work-sustaining clamps or abutments connected with the brushes which take up currents of large volume generated in one set of windings, a rectifying-commutator connected with the other winding and interposed between said windings and the field-coil of the machine, and an adjustable resistance connected with the field-coil circuit for varying the heating-current delivered to the work-sustaining clamps or abutments.

6. In a dynamo-machine for delivering currents of large volume suitable for metal-working operations, a revolving armature having two sets of windings superposed upon one another, connections from one set to the work-sustaining clamps or holders, and connections from the other set through a commutator and variable resistance to the field-maintaining coil of the machine.

7. In an apparatus for electric welding, forging, or other metal-working operations requiring currents of large volume, a dynamo-machine having a revolving armature and suitable collecting-brushes for taking up the current as the armature revolves, in combination with work-sustaining clamps or abutments connected to said brushes, and means for raising one or both of said brushes at will out of contact with the surfaces to which the armature-coil terminals are connected.

8. The combination, with the clamps or electrodes for holding the work, of the collecting-brush hinged or pivoted to the body of said clamps.

9. The combination, with the dynamo, the clamps or holders, the collectors, one or both pivoted and connected with the holders for the work, means for lifting one or both collectors, and a catch for maintaining the collector in lifted position.

Signed at Lynn, in the county of Essex and State of Massachusetts, this 21st day of May, A. D. 1888.

ELIHU THOMSON.

Witnesses:
OTIS K. STUART,
J. W. GIBBONEY.